Aug. 15, 1961     H. E. PHILBROOK     2,996,092
PIMIENTO CORE REMOVER
Filed Feb. 17, 1959     4 Sheets-Sheet 1
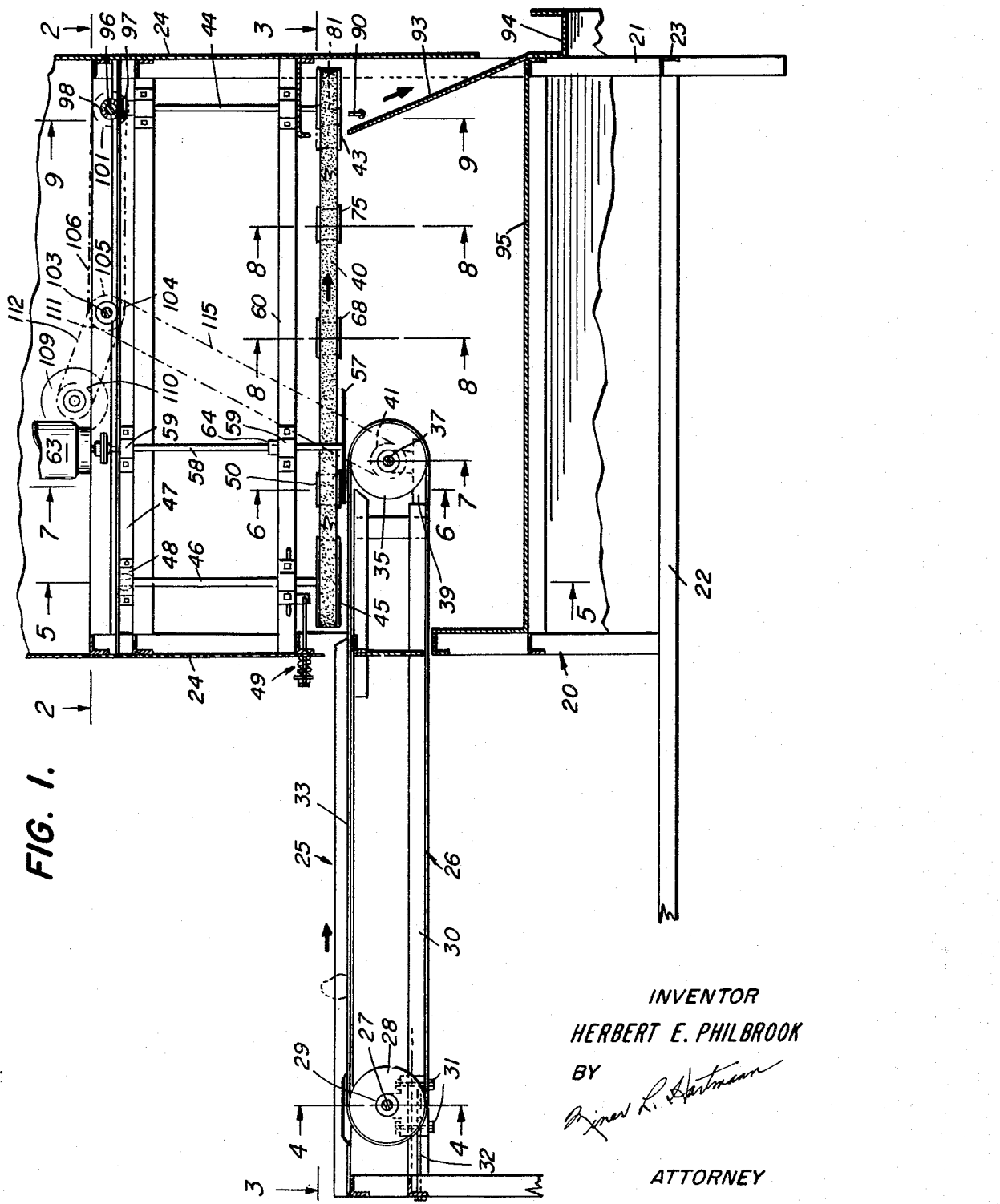
FIG. I.
INVENTOR
HERBERT E. PHILBROOK
BY
ATTORNEY Aug. 15, 1961
H. E. PHILBROOK
2,996,092
PIMIENTO CORE REMOVER
Filed Feb. 17, 1959
4 Sheets-Sheet 2
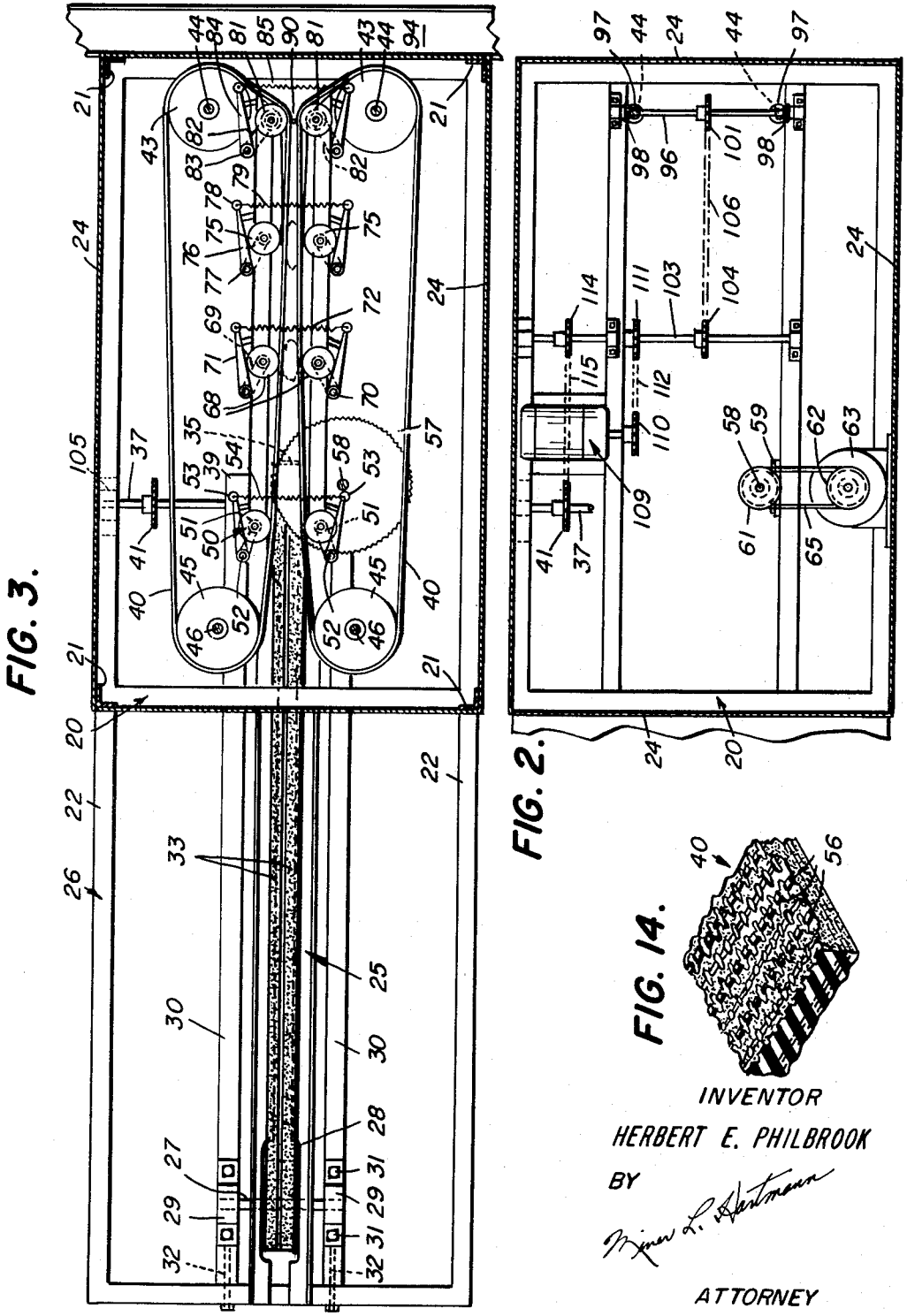
INVENTOR
HERBERT E. PHILBROOK
BY
ATTORNEY

INVENTOR
HERBERT E. PHILBROOK
BY
ATTORNEY

Aug. 15, 1961  H. E. PHILBROOK  2,996,092
PIMIENTO CORE REMOVER
Filed Feb. 17, 1959  4 Sheets-Sheet 4
FIG. 9.
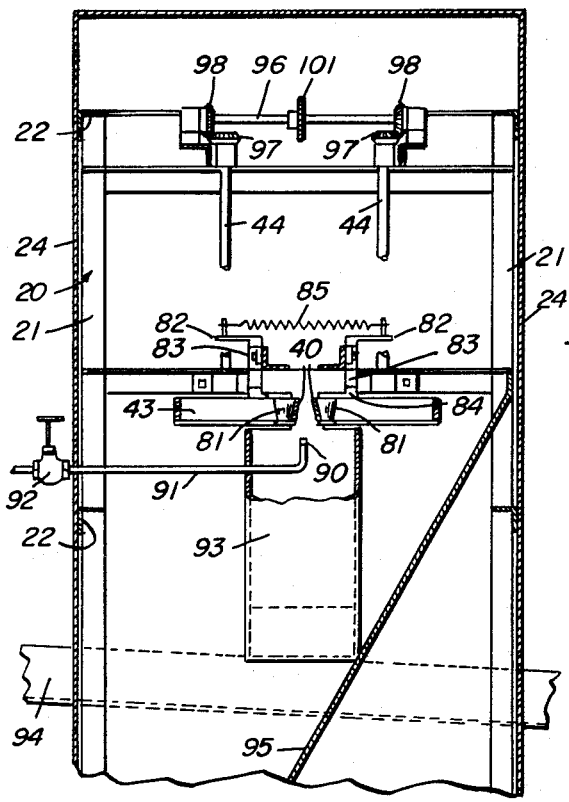
FIG. 10.
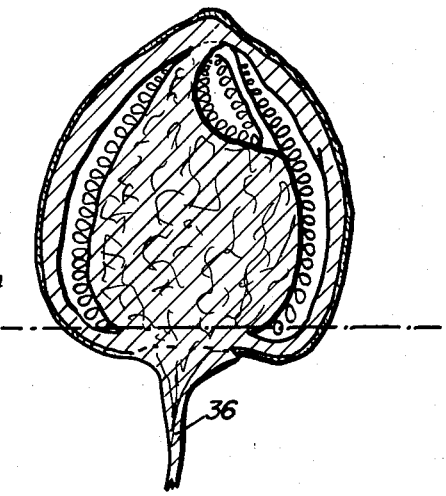
FIG. 11.
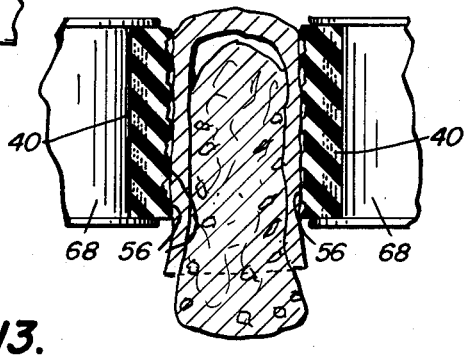
FIG. 12.
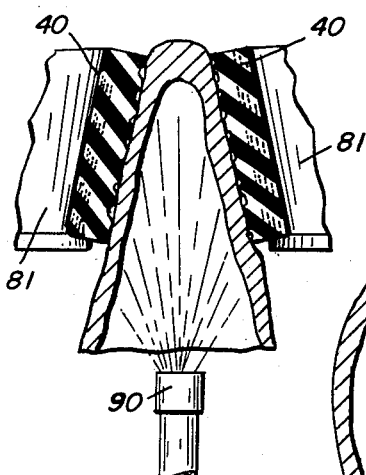
FIG. 13.
INVENTOR
HERBERT E. PHILBROOK
BY
ATTORNEY

United States Patent Office 2,996,092
Patented Aug. 15, 1961

2,996,092
PIMIENTO CORE REMOVER
Herbert E. Philbrook, Tarzana, Calif., assignor to Gentry Division, Consolidated Foods Corporation, a corporation of Maryland
Filed Feb. 17, 1959, Ser. No. 793,729
4 Claims. (Cl. 146—52)

This invention relates to a machine and process for removing the seed core from whole pimientos.

In the preparation of pimientos for canning, brining, dehydro-freezing, dehydration, or freezing, it is desirable to remove the stem, seed core and seeds from the enclosing fleshly shell with the minimum amount of breaking or tearing of the shell, so that the canned brined, dehydro-frozen, dehydrated or frozen product will consist substantially of "whole" pimientos. The skins must also be removed prior to the coring operation and this skin removal leaves the surfaces of the pimientos in an extremely slippery condition which increases the difficulty of feeding and holding them in the coring operation. It should be noted here that the usual process of removal of skins is to flashburn the surfaces of the fresh pimientos, and then rub off the charred skin. This operation also gives a desired "burned" flavor and reduces the flesh of the pimiento to a flaccid thin shell supported by the somewhat rigid seed core.

In previous methods and means for removing the cores of pimientos for example as shown in Rigney Patent No. 2,495,422, a rotary cutter tool has been caused to enter the stem-end of the fruit in a longitudinal or axial direction, thereby severing the seed core from the flesh around the stem, following which the cutter is withdrawn and an associated corkscrew brings out the seed core and the severed flesh around the stem-end. Machines for carrying out these steps have been only partly successful, because of the difficulty of holding the slippery pimientos during the coring operation, because so much manual attention was required to properly center the fruit over the cutter, and additionally, there was too much breaking and tearing of the flesh of the pimientos due in part to the irregular sizes and shapes of the fruit, and to the slippery, flaccid nature of the pimientos before and after coring. The imperfect working of these coring machines also resulted in much additional hand labor in finishing the coring operation—removing left-over parts of the seed core by use of hand knives. The cost of preparation of the fruit for canning was high, and too many broken pieces were produced.

I have discovered that when the stem end of the pimiento is cut off just above the zone of attachment of the outer flesh of the seed core (marked decapitation line in FIG. 10) the seed core is severed completely from the flesh shell except for some weak fibers near the blossom end, and that subsequent simple squeezing of the walls of the fruit will break these fibers and cause the severed seed core and the attached seeds to "pop" out, leaving an unbroken flaccid shell of pimiento flesh. Any remaining loose seeds may then be washed out by a water spray. The squeezing out of the seed core may be accomplished by hand operation, or by any mechanism which squeezes the opposite walls of individual cut-off pimientos.

The principal object of the invention, then, is to provide a simple process for removing the cores and seeds of fresh pimientos. Another object is to provide a simple machine for coring pimientos. Another object is to provide a machine which by means of opposed parallel belts holds and conveys a skinned pimiento through a decapitation means, through lateral squeezing means and subsequently through internal spray washing means, and provides completely cored whole pimiento flesh shells, ready for canning, or other processing.

These and other objects of my invention will be understood from the following description, reference being made to the accompanying drawings in which:

FIG. 1 is a side elevational view, partly in section, showing a preferred form of my coring machine;

FIG. 2 is a top plan view taken from the position 2—2 of FIG. 1;

FIG. 3 is a horizontal sectional view taken on the line 3—3 of FIG. 1;

FIG. 9 is a fragmentary vertical cross-section view taken on the line 9—9 of FIG. 1;

FIG. 10 is a cross-sectional view of a typical pimiento;

FIG. 11 is an enlarged fragmentary cross-sectional view taken approximately at the position of FIG. 8 showing a pimiento shell being squeezed between the juxtaposed squeezer belts;

FIG. 12 is a fragmentary cross-sectional view taken approximately as in FIG. 9 showing a pimiento shell engaged between the vertically inclined squeezer belt surfaces, with a water jet directed inside the shell;

FIG. 13 is a cross-sectional representation of the finished pimiento shell with the seed core removed; and FIG. 14 is a perspective view of the roughened or knob patterened surface of the belt used for conveying and squeezing the pimientos on their passage through the coring machine.

Figure 4:
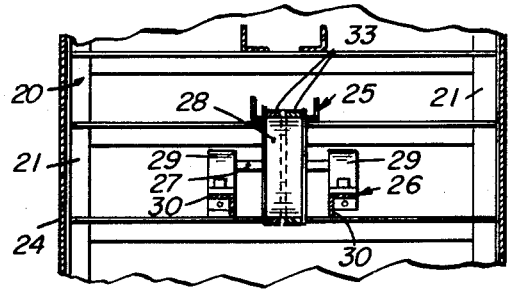
FIG. 4 is a vertical cross-sectional view taken on the line 4—4 of FIG. 1.
Figure 5:
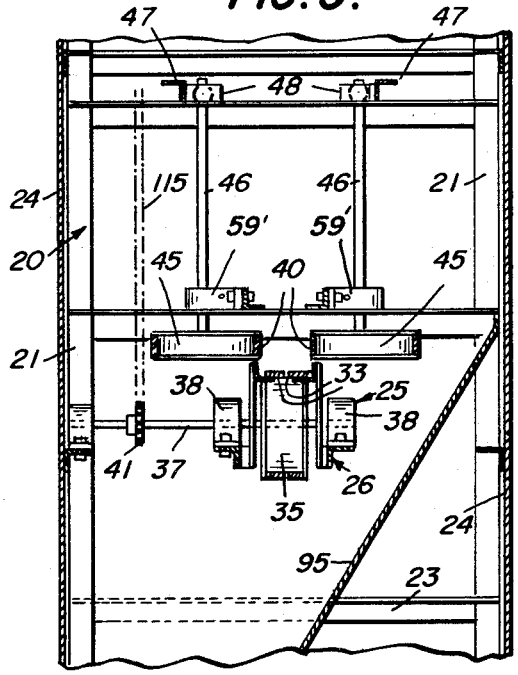
FIG. 5 is a vertical cross-sectional view taken on the line 5—5 of FIG. 1.
Figure 6:
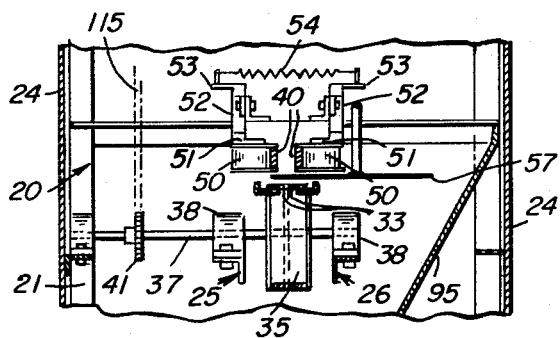
FIG. 6 is a fragmentary cross-sectional view taken on the line 6—6 of FIG. 1.
Figure 7:
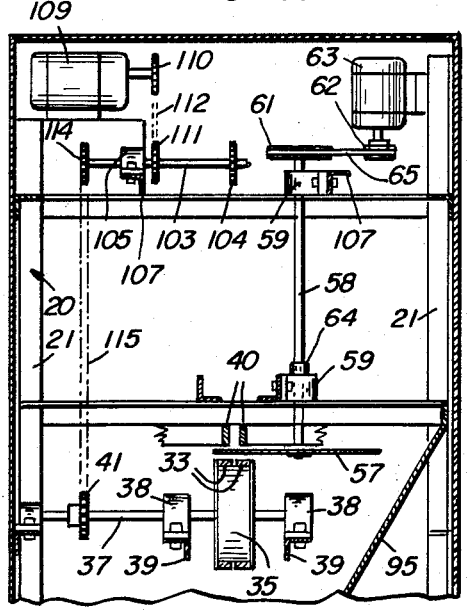
FIG. 7 is a fragmentary vertical cross-sectional view taken on the line 7—7 of FIG. 1.
Figure 8:
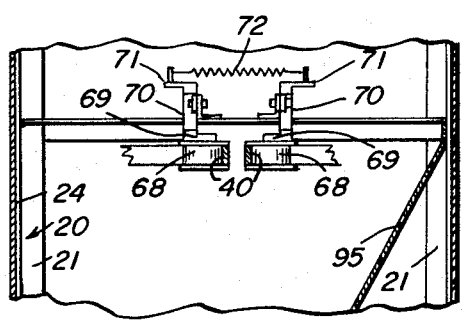
FIG. 8 is a fragmentary cross-sectional view taken on the line 8—8 of FIGURE 1.

Referring to the drawings, a preferred form of the coring device of my invention consists generally of an elongated rectangular frame 20 including vertical members 21 at the four corners and with horizontal side frame members 22 and cross frame members 23 forming a skeleton which is covered with removable metal sheets 24 for enclosing the operative machinery, for safety and neatness. Adjacent the entrance end of the machine there is provided a feed-in belt conveyor 25 mounted on a feed-in conveyor frame 26. The feed-in conveyor comprising a tail pulley 28 mounted on a tail shaft 27, this this shaft being supported on bearing blocks 29 held on the side rails 30 by bolts 31, there being a take-up screw 32 arranged for adjusting the tension on horizontal twin belts 33 which are maintained in spaced apart relation in passing over the tail pulley 28 and over a head pulley 35, so that there is an opening between these belts 33 adapted to receive the stem 36 of the pimientos which are placed by hand on the twin belts as will be further described.

The head pulley 35 is mounted on a head shaft 37, this shaft being operatively mounted in bearing blocks 38 which in turn are attached to longitudinal support members 39 which are supported on the frame 26, the position of the head pulley 35 being disposed so that the horizontal twin belts 33 convey the pimientos into position to be engaged and picked up by a pair of juxtaposed vertically disposed squeezer belts 40, which are arranged to carry the pimientos through the decapitating means, which will now be described.

The vertically disposed squeezer belts 40 are arranged so that through the inside belt run their surfaces are generally vertical and in juxtaposed position, being separately mounted on their own drive and idler pulleys. On the inside belt run, the belts are spaced apart by opposed pairs of spring tensioned idler pulleys so that a pimiento may be conveyed between them from the inside end of the feed-in conveyor to the discharge chute, being processed in transit to remove the seed core. Each of the pair of squeezer belts 40 is arranged to pass over its own head pulley 43 mounted on its own head shaft 44 and its own tail pulley 45 also mounted on its own tail shaft 46. The tail shafts 46 in bearings 59', are mounted in spherical seat bearings 48 mounted on intermediate horizontal structural members 47 near the top of the main frame, the lower ends of the shafts 46 being positioned by take-up spring anchors 49 adjacent the tail pulleys 45.

The vertical head shafts 44 for the squeezer belt head pulleys 43 are driven by means of miter gears 97 on the upper ends of the shafts 44 which are operatively engaged by corresponding miter gears 98 on the horizontal gear shaft 96. A sprocket 101 mounted on the shaft 96 is operatively connected to the counter shaft 103 through a drive sprocket 104 and chain 106. The counter shaft is mounted in bearing blocks 105 secured to the horizontal frame members 22 and intermediary frame members 107. The main motor 109 drives the counter shaft 103 by means of sprockets 110 and 111, through the sprocket chain 112. The head pulley shaft 35 of the feed-in conveyor belts 33 is driven by means of the sprocket 114 on the counter shaft 103, the chain 115, and the sprocket 41 on the head pulley shaft 37.

The working surfaces of the squeezer belts 40 are roughened or cut in patterns of projecting flexible knobs 56 as shown in FIG. 14. (One such patterned belt is sold under the trademark Tred-Tex, being manufactured by Haultain-Champion Co., of Oakland, California.)

A first pair of spring pressured rolls 50 is disposed above the end of the feed-in conveyor 25, and these rolls press upon the smooth or inner faces of the squeezer belts 40. Each of these rolls 50 is rotatably mounted on one arm 51 of a bell crank which is pivoted on the pivot 52, the spring arm 53 of the bell crank being spring-tensioned by the spring 54 which inter-connects the two spring arms 53 of the opposed pressure roll of the pair, so that the opposed rolls press the two squeezer belts together to thereby engage an individual pimiento which has been brought up to this changeover point on the feed-in conveyor.

While the pimiento is thus held, the moving squeezer belts 40 carry it, stem end down, through a saw 57 which decapitates it at the decapitation line as indicated on FIG. 10. The circular saw 57, which is horizontally disposed, is operatively mounted on the saw shaft 58 which is mounted in bearings 59 which are supported by intermediate cross structural members 60, the upper end of the saw shaft 58 being provided with a belt pulley 61 which is driven through the belt 65 by the drive pulley 62 on a motor 63, supported on the structural members of the main frame 20. A thrust collar 64 is provided on the saw shaft 58 so that the elevation of the saw may be adjusted to a position below the lower edges of the squeezer belts 40.

As the squeeze belts move from the feed-in end to the discharge end of the machine, they are engaged by successive pairs of oppositely disposed spring pressed rolls which hold and increasingly squeeze the pimiento between the belts to thereby eject the seed core from the pimiento shell, the seed core having been severed from the flesh when the stem and stem-end portion of the pimiento shell was cut off. The second pair of spring pressured rolls 68 are mounted on a pair of second bell crank arms 69 which in turn are pivoted on second bell crank pivots 70, the second spring arms 71 being connected together by a tension spring 72. These rolls 68 also press upon the inside or smooth surfaces of the opposed pair of squeezer belts 40.

A third pair of spring pressure rolls 75 is also mounted on third bell crank arms 76, these being pivoted by the third bell crank pivots 77, the spring arms 78 being joined by a third tension spring 79.

Additional intermediary pairs of spring pressured rolls may be used if desired.

A final pair of spring pressured rolls 81 is operatively mounted at the end of the squeezer belt run and near the discharge end of the machine, being mounted in a similar manner on bell crank arms 82 which are mounted on bell crank pivots 83 with the spring arms of the pair of bell cranks being joined by a tension spring 85. The rolls 81 of this final pair of spring pressured rolls are truncated cones instead of cylinders, so that the opening between the belts at the lower belt edge is greater than at the upper belt edge, thereby allowing the decapitated, cored pimiento shell to be held securely by the top edge portion of the squeezer belt while the shell is free to be opened at the lower belt edge, as shown particularly in FIG. 12, this arrangement permitting the washing out of any residual seeds or core material or holding fibers by a water jet nozzle 90 which is directed toward the open end of the pimiento. The water jet nozzle is connected to the water pipe 91, there being a control valve 92.

After the cored and washed pimiento shell is discharged at the end of the squeezer belts 40, as they pass over the head pulleys 43, the pimientos fall down the chute 93 into a discharge trough 94 which contains flowing water in which the prepared pimiento shells are conveyed away from the machine.

The entire machine except the feed-in conveyor is enclosed by the metal sheets 24 as previously described so that the debris, seeds, cores, water, etc., are retained and are carried out at the bottom of the machine through a waste chute 95.

The process of coring the pimiento will be understood from the above description. In general the skins of the pimientos are first removed in a preceding separate operation by flash burning and subsequent washing and rubbing in tumbling drums, following which the pimientos are delivered to the entry of the feed-in conveyor where they are individually placed by hand on the spaced apart twin horizontal conveyor belts with the stem projecting into the opening between the belts. The feed-in conveyor carries the pimientos into the coring machine, and at the end of the feed-in belt each pimiento is picked up by engagement between the squeezer belts 40, the pressure between these belts being regulated in steps in four or more stages. At the initial stage the pimiento is held securely between the squeezer belts as the projecting lower stem end of the pimiento is passed through a decapitator saw. This saw cuts the pimiento slightly above the area where the seed core is attached to the shell or main body of the pimiento adjacent the stem, thereby freeing the core with its seeds except for a few fibers and membranes which hold the seed core to the inside walls of the shell. After decapitation, the shell containing the loosened seed core is progressively squeezed more and more until the seed core is ejected from the open end of the pimiento. Near the end of the run of the squeezer belts the pimiento passes over a water jet with the stem end of the shell being opened under the impact of the water jet, the holding by the squeezer belts being applied principally at the upper or blossom end portion of the pimiento. This water jet treatment removes any seeds or pieces of the core which remain inside the shell, following which the whole shell is discharged into a water conveyor.

The process may be carried out by hand, cutting off the stem end by using any cutting tool, and then squeezing the decapitated pimiento in the hand or hands to eject the seed core.

The advantages of my new process, and the machine for efficiently coring pimientos will be clear from the above description. The coring operation does not require close grading for size of the pimientos since the squeezer belts automatically engage and hold fruit of various sizes and shapes. The decapitation saw removes a small portion of the pimiento flesh but the loss by horizontal decapitation is more than offset by the advantage of producing cored whole pimientos which are much desired in the trade. The squeezing operation to remove the cores and the washing treatment by a jet of water does not tear or injure the whole pimientos. The machine operates so effectively that the amount of hand labor to make the final cleanup of the pimiento shells for canning purposes is very greatly reduced.

The objectives stated at the beginning of this specification have been attained.

I claim:

1. A coring machine for fresh pimientos comprising in combination a supporting frame; a horizontally disposed feed-in belt conveyor upon which pimientos are similarly orientated mounted on said frame; a squeeze belt conveyor means mounted on said frame, the entrance end of said squeeze belt conveyor means being disposed to receive pimientos from said feed-in conveyor, said squeeze belt conveyor means consisting essentially of a pair of continuous conveyor belts having vertical surfaces disposed in juxtaposition during at least a portion of the run of said belts, said juxtaposed belt portions being pressed laterally to engage the opposite sides of whole pimientos and carry them through said machine; a horizontally disposed decapitating means mounted on said frame and positioned to cut off the stem end portion of a pimiento held between said belts and protruding therefrom; and pressing means for applying lateral pressure to said squeeze belts to force out the seed core of said decapitated pimientos held between said belts.

2. A coring machine for fresh pimientos comprising in combination a supporting frame; a horizontally disposed feed-in continuous conveyor mounted on said frame, said feed-in conveyor having a surface adapted to receive a succession of whole pimientos spaced apart and disposed resting on their stem ends; a squeeze belt conveyor means mounted on said frame, and disposed to receive pimientos from said feed-in conveyor, said squeeze belt conveyor means comprising essentially a pair of conveyor belts having vertical surfaces disposed in juxtaposition during at least a portion of the run of said belts, said juxtaposed belt portions being pressed laterally to engage the opposite sides of the whole pimientos and carry them through said machine; a horizontally disposed decapitating means mounted on said frame for rotation slightly below the lower edges of said squeeze conveyor belts and positioned to cut off the stem end portion of a pimiento held between said pair of belts and protruding below said belts; and spring pressed guide rolls disposed against opposite portions of said squeeze belts, whereby additional pressure is applied to said decapitated pimientos held between said belts to eject the core of said pimiento.

3. A machine for coring fresh pimientos comprising in combination a rectangular frame having horizontal and vertical members arranged to support the operative parts of the machine; a horizontally disposed feed-in conveyor whose surface is adapted to receive a succession of whole pimientos spaced apart and resting on their stem ends, said feed-in conveyor being mounted adjacent to and partly within the entrance end of said frame; a squeeze conveyor means including drive and idler pulleys and a pair of continuous conveyor belts having vertical surfaces disposed in juxtaposition during at least a portion of the run of said belts, the juxtaposed portions being arranged in overlapping relation at the end of and above the surface of said feed-in conveyor, said juxtaposed belt portions being adapted to engage the opposite sides of the whole pimientos carried in between them by said feed-in conveyor; a first pair of spring pressed guide rolls mounted on said frame, one roll of said first pair being disposed against each of said belts at opposite positions adjacent the inner end of said feed-in conveyor whereby holding pressure is applied to said pimientos between said belts; a horizontally disposed decapitating means mounted for operation slightly below the lower edges of said squeeze conveyor belts and positioned to cut off the stem end portions of a pimiento held between said opposed pair of belts; at least one additional pair of spring pressed guide rolls mounted on said frame, each roll of said additional pair being disposed against each of said squeeze belts at opposite positions at an intermediate location along said juxtaposed portion of the run of said squeeze conveyor belts, whereby additional pressure is applied to said pimientos between said belts to eject the seed core of said pimiento.

4. A machine for coring fresh piementos comprising in combination a rectangular frame having horizontal and vertical members arranged to support the conveyors, motors and other operative means; a horizontally disposed feed-in conveyor whose surface is adapted to receive a succession of whole pimientos spaced apart and resting on their stem ends, said feed-in conveyor being mounted adjacent to and partly within the entrance end of said frame; a squeeze conveyor means including drive and idler pulleys and a pair of continuous conveyor belts having vertical surfaces disposed in juxtaposition during at least a portion of the run of said belts, the juxtaposed portions being arranged in overlapping relation at the end of and above the surface of said feed-in conveyor, said juxtaposed belt portions being adapted to engage the opposite sides of the whole pimientos carried in between them by said feed-in conveyor; a first pair of spring pressed guide rolls mounted on said frame, one roll of said first pair being disposed against each of said belts at opposite positions adjacent the inner end of said feed-in conveyor whereby holding pressure is applied to said pimientos between said belts; a horizontally disposed decapitating means mounted for operation slightly below the lower edges of said squeeze conveyor belts and positioned to cut off the stem end portion of a pimiento held between said opposed pair of belts; at least one intermediate pair of said spring pressed guide rolls mounted on said frame, each roll of said intermediate pair being disposed against each of said squeeze belts at opposite positions at an intermediate location along said juxtaposed portion of the run of said squeeze conveyor belts, whereby additional pressure is applied to said pimientos between said belts; a terminal pair of spring pressed guide rolls mounted on said frame, one roll of said terminal pair being disposed against each of said belts at opposite positions adjacent the terminal end of said juxtaposed portion of the run of said conveyor belts, said guide rolls having truncated conical faces with lesser diameters on the lower edge thereof whereby said belts are spread apart at their lower edges while the upper edges continue to hold said cored pimientos; and water jet means disposed below said juxtaposed squeeze belts at said terminal guide rolls whereby forceful jets of water are projected into said core pimientos; and operatively connected motors and drive means for actuating said feed-in conveyor, said pair of squeeze conveyor belts and said decapitating means.

References Cited in the file of this patent

UNITED STATES PATENTS

| | | |
|---|---|---|
| 1,785,006 | Duncan | Dec. 16, 1930 |
| 2,327,343 | Ewald | Aug. 24, 1943 |
| 2,372,646 | Barnby et al. | Apr. 3, 1945 |
| 2,482,837 | Buckner | Sept. 27, 1949 |
| 2,688,993 | White | Sept. 14, 1954 |
| 2,809,741 | Keilig | Oct. 15, 1957 |
| 2,884,657 | Miller | May 5, 1959 |

FOREIGN PATENTS

| | | |
|---|---|---|
| 22,086 | Great Britain | Oct. 1, 1913 |